Dec. 19, 1961  R. G. FLOWERS  3,013,906
POLYESTER FILM MATERIAL AND PROCESS FOR MAKING SAME
Filed March 20, 1959  2 Sheets-Sheet 2
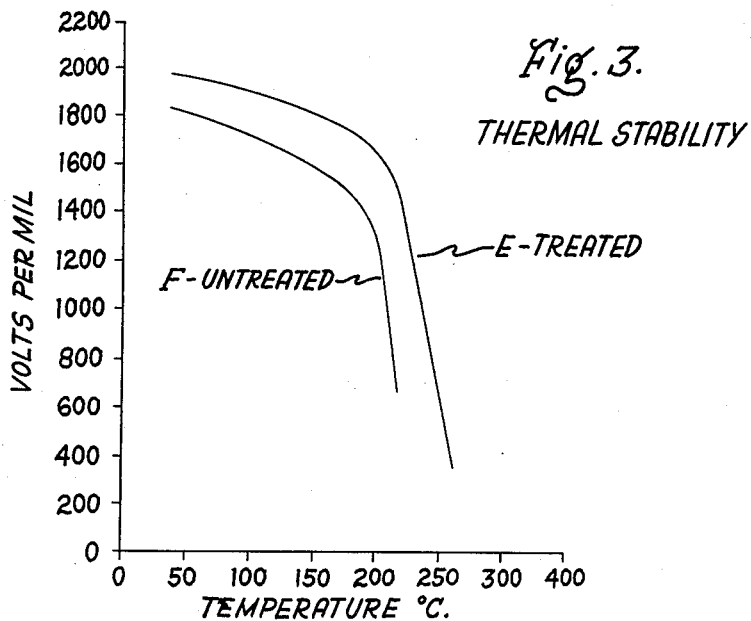
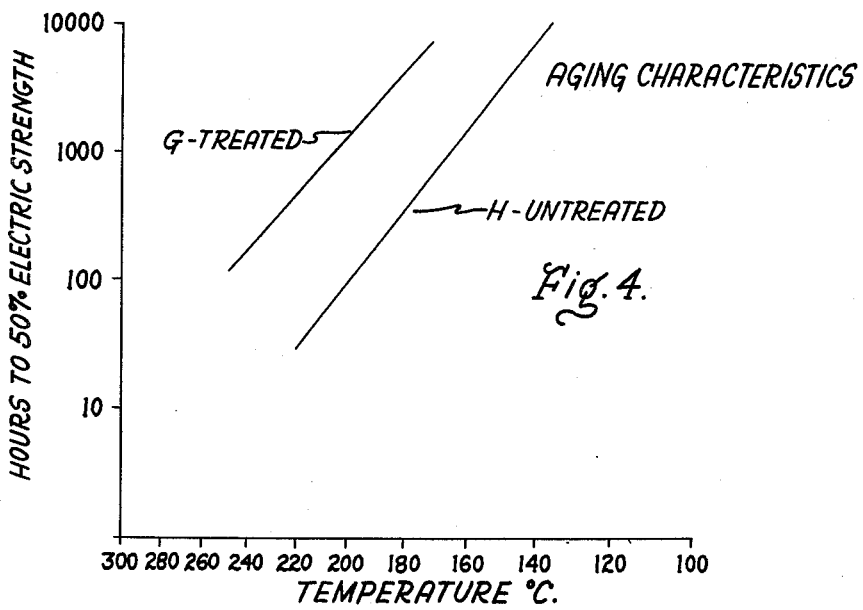
Inventor,
Ralph G. Flowers,
by Gilbert P. Tarleton
His Attorney.

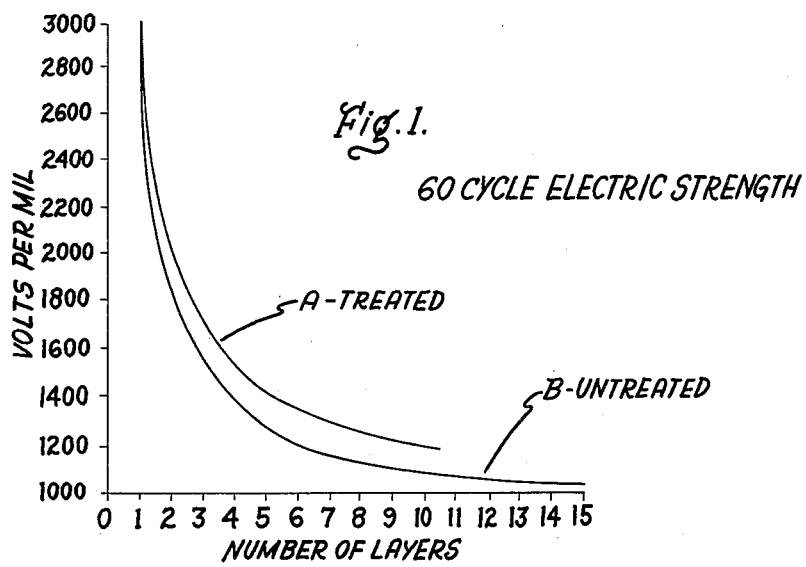
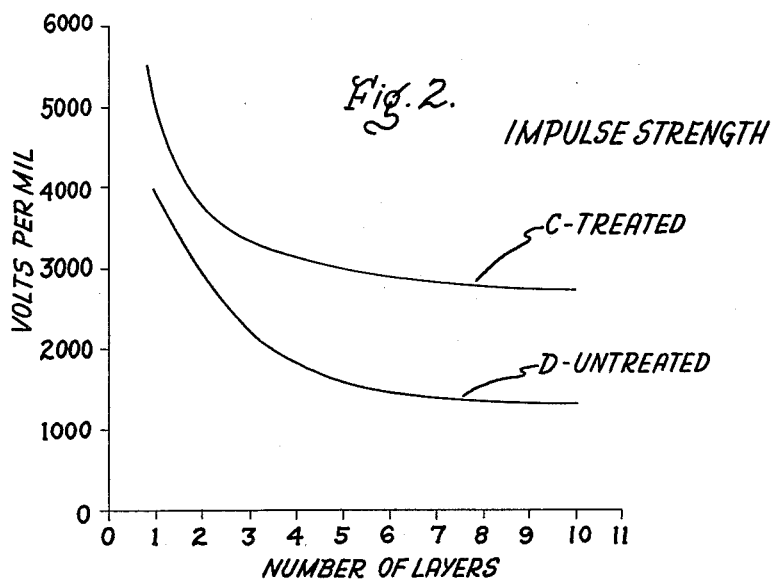

3,013,906
POLYESTER FILM MATERIAL AND PROCESS FOR
MAKING SAME
Ralph G. Flowers, Pittsfield, Mass., assignor to General
Electric Company, a corporation of New York
Filed Mar. 20, 1959, Ser. No. 800,680
12 Claims. (Cl. 117—118)

The present invention relates to electrically insulating films, and more particularly to electrical insulating films of polyester type having improved thermal resistance and other properties and to a method of preparing the same.

Polyester films such as those composed of polyethylene terephthalate have been found useful heretofore as layer insulation in various types of electrical apparatus such as capacitors, transformers, and the like, this material having good mechanical strength, non-hygroscopic properties and good thermal stability. However, even with its relatively high temperature resistance, this insulation material still places a limit on the maximum temperature at which the electrical apparatus can operate.

It is an object of the invention to provide a polyester material, especially a polyethylene terephthalate insulating film, having improved thermal stability and other improved properties, and a method for making the same.

Other objects and advantages will become apparent from the following description and the appended claims.

In a broad aspect, the invention relates to the product obtained by treating with polymethylene polyphenylisocyanate a polyester resin material comprising the product of reaction of a mixture of ingredients comprising a dihydric aliphatic alcohol and a dibasic aromatic compound selected from the group consisting of terephthalic acid, isophthalic acid, dialkyl terephthalates, dialkyl isophthalates, and mixtures thereof.

The invention will be better understood from the following description taken in conjunction with the accompanying drawings, in which:

FIG. 1 graphically illustrates the improved electrical strength of a polyester film treated in accordance with the present invention;

FIG. 2 similarly illustrates the improvement in a polyester film in terms of electrical impulse strength;

FIG. 3 shows the improvement produced in the polyester film in terms of thermal stability; and FIG. 4 graphically shows the improvement in aging characteristics provided by the present invention in a polyester material.

Polyester resin materials preferred for use in practicing the present invention are linear, highly polymerized, high melting point esters of terephthalic or isophthalic acid, or ester forming derivatives thereof such as dialkyl terephthalates or isophthalates, and glycols of the series $HO(CH_2)_nOH$ wherein $n$ is the range of 2 to 10, as disclosed, for example, in the patent to Whinfield et al. 2,465,319. A particularly well known material of this type is polyethylene terephthalate, which has been found to be markedly improved by the treatment of the present invention. Polyethylene terephthalate sheet material suitable for use for the present purposes is commercially available from E. I. du Pont de Nemours & Co. under the trademark Mylar.

While the above particular polyester material is preferred for use in practicing the invention, another type of polyester has also been found to be characterized by improved properties, notably in hydrolytic and solvent resistance, by treatment with polymethylene polyphenylisocyanate in accordance with the invention. This polyester is obtained as a product of reaction of terephthalic acid or isophthalic acid or ester forming derivatives thereof such as those mentioned above, a dihydric aliphatic alcohol and a trihydric aliphatic alcohol. A specific composition of this type which has been found especially useful as electrical insulating coating material for wire is prepared from 3 moles of terephthalic acid, 2 moles of ethylene glycol, and 1 mole of glycerol. The preparation of this material is disclosed in detail in copending application Serial No. 474,624—Procopio et al., filed December 10, 1954, now Patent No. 2,936,296, and assigned to the same assignee as the present invention, and the disclosure of the copending application is hereby incorporated by reference in this specification.

A polyarylpolyisocyanate composition found particularly satisfactory for treating the polyester films described above in accordance with the invention is polymethylene polyphenylisocyanate which is a mixture of compounds having the following generalized structural formula:

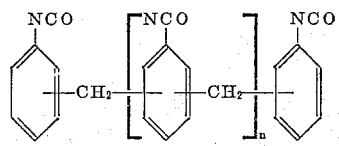

In the above formula, $n$ may vary from an average value of 1 to 3, but preferably has an average value of 1. A material of this composition is sold under the trademark PAPI by the Carwin Company, North Haven, Conn. This material is a dark, amber, somewhat viscous liquid. It has an average theoretical molecular weight of 381–400, a viscosity (21° C.) of about 500–1500 centipoises and an average specific gravity of 1.20. Solvents such as ethyl acetate, butyl acetate, benzene, toluene, chlorobenzene and o-dichlorobenzene may be used to prepare solutions of the above described polyarylpolyisocyanate.

The proportion of the polymethylene polyphenylisocyanate in the solvent solution is not critical, since it is a liquid itself and may under certain conditions be used directly for treating the polyester film without the use of any solvent. Where a solvent is used, the proportion thereof may be of any desired amount to provide the desired viscosity or concentration of the treating material.

In a preferred procedure according to the invention, polyethylene terephthalate film is passed through a solution of the polyarylpolyisocyanate containing a catalyst and the thus treated film is then subjected to a curing heat treatment. In general, when a catalyst is used, curing may be carried out at a temperature of 150–200° C., and preferably 175–185° C., for a period of 1 to 60 minutes, the curing time depending upon the curing temperature and the type and concentration of catalyst employed.

While the use of a catalyst is preferred in order to accelerate the curing process and reduce the curing temperature, the catalyst may be omitted entirely if desired and the curing carried out simply by a heat treatment. Without a catalyst, a typical heat treatment will require about two hours at 200° C. or a correspondingly shorter period at a higher temperature up to about 250° C.

Catalysts which have been found effective to produce the desired results are the boron tri-fluoride complexes of p- and o-toluidine, of urea, and of piperidine, and metal driers such as cobalt naphthenate, zinc octoate, and lead naphthenate. The amount of catalyst present in the solution is not critical and as indicated above the catalyst may be omitted entirely. More than 10% of the catalyst by weight of the solution, however, is not normally practical in carrying out the present process.

The following examples will further illustrate the invention, it being understood that the invention is not intended to be limited thereby:

Example I

A polyethylene terephthalate film of one mil thickness was dipped into a solution composed of 30 parts of polymethylene polyphenylisocyanate and 70 parts of ethyl acetate, the solution also containing 5 parts of a catalyst consisting of $BF_3$-piperidine. A number of samples of the thus treated film were subjected to curing heat treatments at different temperatures. The time of curing was found to vary from 15 minutes with a curing temperature of 185° C. to 45 hours at 125° C.

Example II

Polyethylene terephthalate film material such as that of Example I was treated in a solution as described in the above example except that no catalyst was present in the solution. Heating periods required to cure samples of this treated material varied from 2 hours at 200° C. to 72 hours at 125° C.

Example III

The process of Example I was repeated using 5 parts of $BF_3$-p-toluidine as the catalyst. Curing of the thus treated polyester film was achieved in 3 minutes at a temperature of 175° C.

Example IV

The process of Example I was repeated using 5 parts of $BF_3$-urea as the catalyst, and the curing was carried out in this process in 30 minutes at a temperature of 175° C.

Example V

The process of Example I was duplicated except that 5 parts of cobalt naphthenate (6%) were incorporated in the solution as catalyst. Curing in this case was accomplished in 5 minutes at a temperature of 190° C.

Example VI

In this process which was the same as the Example I process, 5 parts of zinc octoate (8%) were employed, and the treated film was cured in 19 minutes at 190° C.

Example VII

The process of Example I was repeated using 5 parts of lead naphthenate as the catalyst, curing being carried out with this catalyst in 10 minutes at 190° C.

The samples produced by the above-described treatments were subjected to a cut-through test to determine their mechanical resistance at elevated temperature. This test involved placing a ball-point piercing instrument weighted with 10 lbs. on the treated samples while the samples gradually were heated until the weighted ball-point cut through the film. Penetration of the instrument through the treated polyester films was determined by electrical contact made by the instrument with a metallic support on which the samples were placed. In every case, it was found that whereas penetration occurred on untreated polyester terephthalate film when heated to 250° C., penetration of the treated polyethylene terephthalate films of the same thickness did not occur until they were heated to a temperature of 300° C. These tests thereby indicated a thermal upgrading of the insulating polyester film of about 50° C. due to the treatment provided by the present invention.

The drawings illustrate graphically the improved electrical and thermal properties of polyethylene terephthalate films treated with polymethylene polyphenylisocyanate in accordance with the invention. The films on which the illustrated data were obtained were processed by drawing the film through a catalyzed solution of polymethylene polyphenylisocyanate and then up through a vertical oven heated to 175° C.

FIG. 1 shows the electrical strength of polyethylene terephthalate film material treated in accordance with the invention as compared to similar films without such treatment. In the graph, in which the electrical strength in volts per mil is plotted against the number of layers of the films, curve A represents the polyarylpolyisocyanate treated films, while curve B represents the untreated films. The respective films in pads of varying numbers of layers were subjected under oil to a 60 cycle electrical charge at increasing voltage for one minute holding periods until breakdown occurred. The treated films had a thickness of 3 mils per layer, whereas the untreated films were 2 mils thick per layer. As shown by the FIG. 1 curves, the treated films exhibited greater electrical strength in terms of volts per mil than the untreated films over the entire range of layer quantities. This result was quite unexpected, especially in view of the usual experience of those familiar with the electrical insulating art that the thinner the insulating film, the greater the electrical strength per mil.

FIG. 2 is a graph showing comparative electrical impulse strength of the treated and untreated polyethylene terephthalate films, the impulse strength in volts per mil being plotted against the number of layers of insulating sheets. The untreated sheets were 5.4 mils thick per layer and the treated sheets were 6.9 mils thick per layer. In this test the respective pads of different numbers of layers were subjected while immersed in mineral oil to a standard impulse test using a 1½ x 40 microsecond wave at voltages increasing in steps until breakdown occurred. As shown in the graph, the treated polyethylene terephthalate film represented by curve C withstood considerably greater impulse stress than the untreated film represented by curve D, the improvement provided over the untreated material ranging up to more than 100%. In this case, too, it would normally have been expected that greater impulse strength per mil would be obtained from the untreated material because it was thinner, but the reverse was actually found.

FIG. 3 shows the results of a test made to determine the comparative thermal stability of treated and untreated polyethylene terephthalate film samples. In the graph, in which electrical breakdown in volts per mil is plotted against temperature in degrees centigrade, curve E represents the treated samples comprising two layers each 2.7 mils thick, and curve F represents the untreated samples of two layers each 2.2 mils thick. Electrical charges as described in connection with the FIG. 1 test were applied in this test with the samples at various temperatures. As shown in the FIG. 3 graph, the untreated samples exhibited substantially lower breakdown values over the temperature range of the test than the treated samples. Of particular significance is the fact that the maximum temperature which could be applied to the untreated samples without melting the material is about 220° C., whereas the treated samples showed appreciable electrical strength up to 250–260° C. and did not melt up to that temperature. The data thus indicates that not only is the initial electrical strength of the polyester film at elevated temperature levels markedly increased by virtue of the present invention as compared to that characteristic of untreated polymethylene terephthalate films, but also the usable temperature range of this material is increased 50° above the previous maximum of about 200° C.

FIG. 4 graphically shows the results of aging tests made on treated polyethylene terephthalate samples to determine their life characteristics under severe electrical and thermal stress. In the graph, the time in hours to 50% electrical strength is plotted against temperature in degrees centigrade. Curve G represents polyethylene terephthalate samples treated in accordance with the present invention and comprising two layers 2.7 mils thick. Curve H is taken from A.I.E.E. Transactions, vol. 73, Part I, 1954, pp. 193–97, and represents untreated polyethylene terephthalate samples of two layers each 2.2 mils thick. In the tests on which these graphical data are based, samples of the respective materials were subjected to various elevated temperatures in air for a period of time until they had dropped to 50% of their initial electrical strength measured at the aging temperature. The graph shows that the treated samples had considerably longer life, as measured by the above criteria, than the untreated samples, and again demonstrated that the treated samples could withstand a 50° C. higher temperature on the average than the untreated samples while retaining equivalent electrical strength.

There is thus provided by the invention a method of improving the resistance of polyester insulating film material to elevated temperature while at the same time improving its electrical characteristics over a wide range of temperature. As a result, it becomes possible to raise the maximum operating temperature for transformers and other electrical apparatus incorporating such insulating material and thereby enable more efficient use of the electrical capacity of the apparatus without adversely affecting the insulating material.

While there have been shown and described particular embodiments of the invention, it will be obvious to those skilled in the art that changes and modifications may be made without departing from the invention, and, therefore, it is intended by the appended claims to cover all such changes and modifications as fall within the true spirit and scope of the invention.

What I claim as new and desire to secure by Letters Patent of the United States is:

1. The method of making electrical insulating material which comprises reacting with polymethylene polyphenylisocyanate a polyester resin film material comprising the product of reaction of a mixture of ingredients comprising a dihydric aliphatic alcohol and a dibasic aromatic compound selected from the group consisting of terephthalic acid, isophthalic acid, dialkyl terephthalates, dialkyl isophthalates, and mixtures thereof.

2. The method of making electrical insulating material which comprises reacting a material composed of a mixture of compounds of the formula

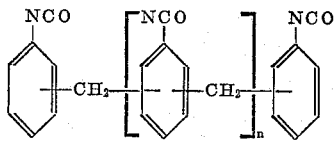

wherein $n$ has an average value of 1–3, with a polyester resin film material comprising the product of reaction of a mixture of ingredients comprising a dihydric aliphatic alcohol and a dibasic aromatic compound selected from the group consisting of terephthalic acid, isophthalic acid, dialkyl terephthalates, dialkyl isophthalates, and mixtures thereof.

3. The method of making a thermally stable, electrically insulating material which comprises reacting with polymethylene polyphenylisocyanate a polyester resin film comprising the product of reaction of a mixture of ingredients comprising a dihydric aliphatic alcohol and a dibasic aromatic compound selected from the group consisting of terephthalic acid, isophthalic acid, dialkyl terephthalates, dialkyl isophthalates, and mixtures thereof, and curing the thus treated polyester resin film.

4. The method of making a thermally stable, electrically insulating material which comprises reacting (1) a polyester resin film material comprising the product of reaction of a mixture of ingredients comprising a dihydric aliphatic alcohol and a dibasic aromatic compound selected from the group consisting of terephthalic acid, isophthalic acid, dialkyl terephthalates, dialkyl isophthalates, and mixtures thereof, with (2) a solution of polymethylene polyphenylisocyanate containing a curing catalyst.

5. The method of making a thermally stable, electrically insulating material which comprises reacting (1) a polyester resin film material comprising the product of reaction of a mixture of ingredients comprising a dihydric aliphatic alcohol and a dibasic aromatic compound selected from the group consisting of terephthalic acid, isophthalic acid, dialkyl terephthalates, dialkyl isophthalates, and mixtures thereof, with (2) a solution of polymethylene polyphenylisocyanate containing a curing catalyst selected from the group consisting of $BF_3$-p-toluidine, $BF_3$-o-toluidine, $BF_3$-urea, $BF_3$-piperidine, cobalt naphthenate, lead naphthenate, and zinc octoate.

6. The method of making electrical insulating material which comprises reacting with polymethylene polyphenylisocyanate a polyester resin film material comprising the product of reaction of a mixture of ingredients comprising a dihydric aliphatic alcohol, a trihydric aliphatic alcohol and a dibasic aromatic compound selected from the group consisting of terephthalic acid, isophthalic acid, dialkyl terephthalates, dialkyl isophthalates, and mixtures thereof.

7. The method of claim 1, wherein the polyester resin film material is composed of polyethylene terephthalate.

8. The method of claim 1, wherein said mixture comprises ethylene glycol, glycerol, and terephthalic acid.

9. The method of improving the thermal resistance and electrical properties of polyethylene terephthalate film which comprises reacting the film with a material composed of a mixture of compounds of the formula

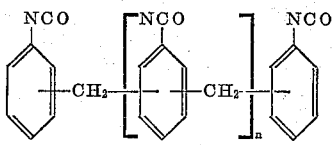

wherein $n$ has an average value of 1.

10. A thermally stable polyester resin material comprising the reaction product of a material composed of a mixture of compounds having the formula

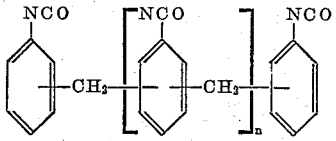

wherein $n$ has an average value of 1, with a polyester resin material comprising the product of reaction of a mixture of ingredients comprising a dihydric aliphatic alcohol and a dibasic aromatic compound selected from the group consisting of terephthalic acid, isophthalic acid, dialkyl terephthalates, dialkyl isophthalates, and mixtures thereof.

11. A polyester resin film having improved thermal stability and electrical properties comprising a film of polyethylene terephthalate reacted with polymethylene polyphenylisocyanate.

12. An electrical insulating film material having improved thermal stability and electrical properties comprising a polyester resin film material reacted with polymethylene polyphenylisocyanate, said polyester resin film material comprising the product of reaction of a mixture of ingredients comprising a dihydric aliphatic alcohol and a dibasic aromatic compound selected from the group consisting of terephthalic acid, isophthalic acid, dialkyl terephthalates, dialkyl isophthalates, and mixtures thereof.

References Cited in the file of this patent
UNITED STATES PATENTS 2,503,209    Nyquist et al. _____ Apr. 4, 1950

FOREIGN PATENTS 533,733    Great Britain _____ June 3, 1943